United States Patent
Li et al.

(10) Patent No.: US 9,641,374 B2
(45) Date of Patent: May 2, 2017

(54) DIRECT-DETECTED ORTHOGONAL FREQUENCY-DIVISION MULTIPLEXING WITH DISPERSION PRE-COMPENSATION DIGITAL SIGNAL PROCESSING

(71) Applicant: Huawei Technologies Co., Ltd., Shenzhen (CN)

(72) Inventors: Chuandong Li, Ottawa (CA); Chen Chen, Ottawa (CA); Zhuhong Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/614,098

(22) Filed: Feb. 4, 2015

(65) Prior Publication Data

US 2015/0222468 A1 Aug. 6, 2015

Related U.S. Application Data

(60) Provisional application No. 61/935,801, filed on Feb. 4, 2014.

(51) Int. Cl.
*H04B 1/38* (2015.01)
*H04L 27/26* (2006.01)
(Continued)

(52) U.S. Cl.
CPC ... *H04L 27/2628* (2013.01); *H04B 10/25137* (2013.01); *H04L 25/03343* (2013.01); *H04L 27/2634* (2013.01); *H04L 27/368* (2013.01)

(58) Field of Classification Search
CPC ...... H04J 14/08; H04J 14/0283; H04J 14/002; H04L 27/2634; H04L 27/2628; H04L 27/368; H04L 25/03343; H04B 10/25137
(Continued)

(56) References Cited

U.S. PATENT DOCUMENTS 8,244,132 B2 * 8/2012 Lin .................... H04B 10/2513
375/260
8,909,061 B1 * 12/2014 Varadarajan ....... H04B 10/6161
398/159
(Continued)

FOREIGN PATENT DOCUMENTS

JP  WO2010137113 A1 * 12/2010
JP  WO 2010137113 A1 * 12/2010 ............... H04B 3/04
(Continued)

OTHER PUBLICATIONS

Sung, et al. "DFT-Precoded Coherent Optical OFDM With Hermitian Symmetry for Fiber Nonlinearity Mitigation," in Journal of Lightwave Technology, vol. 30, No. 17, pp. 2757-2763, Sep. 1, 2012. IEEE 2012.*

(Continued)

*Primary Examiner* — Daniel Washburn
*Assistant Examiner* — Berhanu Tadese
(74) *Attorney, Agent, or Firm* — Slater Matsil, LLP

(57) ABSTRACT

Chromatic dispersion is pre-compensated in a direct-detected orthogonal frequency-division multiplexed optical transmitter through digital signal processing methods, to generate signals that can be transmitted over an optical fiber. The dispersion pre-compensation digital signal processing may include multiplying subcarriers by a respective factor. The dispersion pre-compensation digital signal processing may instead include application of a finite impulse response filter to signals. The dispersion pre-compensation digital signal processing may instead include fast Fourier transformations of signals, application of a frequency domain filter to signals generated by the fast Fourier transformations, and inverse fast Fourier transformations of the signals produced by application of the frequency domain filter.

18 Claims, 8 Drawing Sheets

(51) Int. Cl.
*H04B 10/2513* (2013.01)
*H04L 25/03* (2006.01)
*H04L 27/36* (2006.01)

(58) Field of Classification Search
USPC .................................. 398/43; 375/295, 260
See application file for complete search history.

(56) References Cited

U.S. PATENT DOCUMENTS

| | | | | |
|---|---|---|---|---|
| 9,071,364 | B1* | 6/2015 | Voois | H04B 10/58 |
| 9,112,607 | B1* | 8/2015 | Dave | H04B 10/2513 |
| 9,160,456 | B2* | 10/2015 | Liu | H04B 10/58 |
| 9,203,682 | B2* | 12/2015 | Winzer | H04B 10/60 |
| 2004/0095907 | A1* | 5/2004 | Agee | H04B 7/0417 |
| | | | | 370/334 |
| 2006/0067426 | A1* | 3/2006 | Maltsev | H04L 27/2602 |
| | | | | 375/297 |
| 2006/0263094 | A1* | 11/2006 | Setti | H04B 10/2569 |
| | | | | 398/152 |
| 2007/0116142 | A1* | 5/2007 | Molander | H04L 27/2624 |
| | | | | 375/260 |
| 2007/0206954 | A1* | 9/2007 | Fishman | H04B 10/2513 |
| | | | | 398/159 |
| 2009/0129257 | A1* | 5/2009 | Maltsev | H03F 1/0205 |
| | | | | 370/208 |
| 2009/0232191 | A1* | 9/2009 | Gupta | H04L 27/2096 |
| | | | | 375/216 |
| 2009/0290880 | A1* | 11/2009 | Huang | H04B 10/25137 |
| | | | | 398/115 |
| 2009/0304391 | A1* | 12/2009 | Harley | H04B 10/25137 |
| | | | | 398/147 |
| 2010/0034542 | A1* | 2/2010 | Armstrong | H04B 10/5053 |
| | | | | 398/158 |
| 2010/0135656 | A1* | 6/2010 | Khurgin | H04B 10/61 |
| | | | | 398/43 |
| 2010/0142951 | A1* | 6/2010 | Armstrong | H04B 10/67 |
| | | | | 398/65 |
| 2010/0189445 | A1* | 7/2010 | Nakashima | H04B 10/60 |
| | | | | 398/152 |
| 2010/0220376 | A1* | 9/2010 | Kobayashi | G02F 1/0327 |
| | | | | 359/238 |
| 2010/0247099 | A1* | 9/2010 | Lowery | H04B 10/2543 |
| | | | | 398/79 |
| 2010/0284695 | A1* | 11/2010 | Lin | H04B 10/2513 |
| | | | | 398/81 |
| 2010/0329683 | A1* | 12/2010 | Liu | H04B 10/2513 |
| | | | | 398/81 |
| 2011/0096855 | A1* | 4/2011 | Youn | H04B 10/532 |
| | | | | 375/260 |
| 2011/0135319 | A1* | 6/2011 | Youn | H04B 10/6971 |
| | | | | 398/202 |
| 2011/0176815 | A1* | 7/2011 | Frankel | H04B 10/5053 |
| | | | | 398/184 |
| 2012/0033965 | A1* | 2/2012 | Zhang | H04B 10/611 |
| | | | | 398/38 |
| 2012/0087668 | A1* | 4/2012 | Li | H04L 27/2628 |
| | | | | 398/79 |
| 2012/0141130 | A1* | 6/2012 | Nakashima | H04B 10/572 |
| | | | | 398/82 |
| 2012/0176886 | A1* | 7/2012 | Yu | H04L 27/2614 |
| | | | | 370/210 |
| 2012/0263461 | A1* | 10/2012 | Lowery | H04B 10/2563 |
| | | | | 398/38 |
| 2012/0294616 | A1* | 11/2012 | Sasaki | H04J 14/0298 |
| | | | | 398/79 |
| 2013/0070866 | A1* | 3/2013 | Wu | H04L 27/36 |
| | | | | 375/260 |
| 2013/0071119 | A1* | 3/2013 | Liu | H04B 10/516 |
| | | | | 398/65 |
| 2013/0077979 | A1* | 3/2013 | Dou | H04B 10/2543 |
| | | | | 398/192 |
| 2013/0148971 | A1* | 6/2013 | Yu | H04J 11/00 |
| | | | | 398/79 |
| 2013/0272698 | A1* | 10/2013 | Jin | H04L 27/2628 |
| | | | | 398/43 |
| 2013/0315607 | A1* | 11/2013 | Sadot | H04B 10/2507 |
| | | | | 398/159 |
| 2014/0050493 | A1* | 2/2014 | Sigron | H04B 10/6165 |
| | | | | 398/202 |
| 2014/0072307 | A1* | 3/2014 | Zamani | H04B 10/616 |
| | | | | 398/79 |
| 2014/0147112 | A1* | 5/2014 | Abe | H04B 10/25137 |
| | | | | 398/25 |
| 2014/0286642 | A1* | 9/2014 | Lowery | H04B 10/697 |
| | | | | 398/115 |
| 2014/0376418 | A1* | 12/2014 | Banerjea | H04B 10/612 |
| | | | | 370/278 |
| 2015/0086193 | A1* | 3/2015 | Liu | H04B 10/2543 |
| | | | | 398/28 |
| 2015/0086215 | A1* | 3/2015 | Chen | H04B 10/2507 |
| | | | | 398/136 |
| 2015/0244418 | A1* | 8/2015 | Verbin | H04B 3/32 |
| | | | | 370/201 |
| 2015/0256264 | A1* | 9/2015 | Chen | H04B 10/588 |
| | | | | 398/192 |
| 2015/0256265 | A1* | 9/2015 | Chen | H04B 10/58 |
| | | | | 398/197 |

FOREIGN PATENT DOCUMENTS

| | | |
|---|---|---|
| WO | 2012133473 A1 | 10/2012 |
| WO | 2015043431 A1 | 4/2015 |

OTHER PUBLICATIONS

E. Said et al., "An electrically pre-equalized 10-Gb/s duobinary transmission system," in Journal of Lightwave Technology, vol. 23, No. 1, pp. 388-400, Jan. 2005.*

Yoshida et al., Pre-equalization Transmitter Apparatus and Pre-equalization Transmission System, Dec. 2010_English Language of WO2010137113, Retrieved from Google Pantents.*

English translation of the Japanese document WO2010137113 to Yoshida, et al. retrieved from Google Patents at https://www.google.com/patents/WO2010137113A1).*

Schmidt, B.J.C. et al., "Experimental Demonstrations of Electronic Dispersion Compensation for Long-Haul Transmission Using Direct-Detection Optical OFDM," Journal of Lightwave Technology, vol. 26, No. 1, Jan. 1, 2008, 8 pages.

Taylor, M.G., "Compact Digital Dispersion Compensation Algorithms," IEEE 2008 Optical Fiber Communication/National Fiber Optic Engineers Conference, Feb. 24, 2008, 4 pages.

* cited by examiner

DIRECT-DETECTED ORTHOGONAL FREQUENCY-DIVISION MULTIPLEXING WITH DISPERSION PRE-COMPENSATION DIGITAL SIGNAL PROCESSING

RELATED U.S. APPLICATION

This application claims priority to U.S. Provisional Application No. 61/935,801, entitled "Chromatic Dispersion Tolerance of IMDD-OFDM with Digital Pre-Compensation," filed on Feb. 4, 2014, hereby incorporated by reference in its entirety.

BACKGROUND

Orthogonal frequency-division multiplexing (OFDM) is widely used in contemporary radio frequency wireless communication systems because of its spectrum efficiency and outstanding capability in support of multi-user applications. Efforts are being made to bring OFDM into optical communication systems for long-haul applications. However, those efforts have not met with success because OFDM does not perform as well as other, single-carrier solutions in optical transport systems.

More specifically, OFDM can be described as a double-sideband (DSB) modulation scheme, which can be severely distorted by chromatic dispersion (CD) over longer distances. When symbols are transmitted over longer distances, fading caused by CD can result in inter-symbol interference (ISI); that is, chromatic dispersion causes the light pulses that convey digital information to spread, making it more difficult to distinguish the pulses from one another. For a single-carrier system, power fading can greatly reduce the bandwidth of a fiber optic cable, especially for long-haul optical fibers. The impact of CD can be mitigated by optical coherent detection with much higher cost and power consumption. Because of that, optical coherent detection is only deployed in long-haul application scenarios where cost and power consumption are not of concern.

Direct-detected OFDM (DD-OFDM) is receiving attention for shorter range applications, mostly due to its relatively simple structure and low cost. DD-OFDM provides a good trade-off between optical system capacity and simplicity, and is a promising method for metropolitan applications.

CD-induced power fading is also a problem for DD-OFDM. However, as opposed to a single-carrier system, DD-OFDM can assign information bits to sub-channels depending on the frequencies at which power fading is observed. For example, a high-modulation format can be applied in non-fading frequencies, and the use of fading frequencies to carry information bits can be avoided. This technique is an example of the techniques known as "water-filling." However, the use of water-filling by itself is not the solution to power fading in DD-OFDM systems because it reduces transmission capacity, especially as the number of fading points that are to be avoided increase over long-haul optical fibers.

SUMMARY

In embodiments according to the invention, chromatic dispersion is pre-compensated in a DD-OFDM optical transmitter through digital signal processing methods.

In an embodiment, the dispersion pre-compensation digital signal processing is performed before inverse fast Fourier transformations are performed in the transmitter. In such an embodiment, the dispersion pre-compensation digital signal processing includes multiplying the subcarriers by a respective factor. In another such embodiment, cyclic prefixing is performed.

In another embodiment, the dispersion pre-compensation digital signal processing is performed after inverse fast Fourier transformations are performed in the transmitter. In one such embodiment, the dispersion pre-compensation digital signal processing includes application of a finite impulse response (FIR) filter to signals generated by the inverse fast Fourier transformations. In another such embodiment, the dispersion pre-compensation digital signal processing includes fast Fourier transformations of the signals generated by the inverse fast Fourier transformations, application of a frequency domain filter to the signals generated by the fast Fourier transformations, and inverse fast Fourier transformations of the signals produced by application of the frequency domain filter. In these embodiments, cyclic prefixing may not be performed.

In an embodiment, the DD-OFDM optical transmitter includes a first transmit chain, a second transmit chain, a first digital-to-analog converter (DAC), a second DAC, a first electrical-to-optical (E/O) converter, and a second E/O converter. If dispersion pre-compensation digital signal processing is performed in the first transmission chain, for example, then in-phase and quadrature phase (I/Q) signals from the first transmission chain are input to the first and second DACs, which send their outputs to the first E/O converter. However, if dispersion pre-compensation digital signal processing is bypassed in both the first and second transmit chains, then signals output from the first and second transmission chains will not have a quadrature phase component. Consequently, the signals from the first transmission chain can be sent to the first DAC, which sends its outputs to the first E/O converter, and the signals from the second transmission chain can be sent to the second DAC, which sends its outputs to the second E/O converter, thereby doubling capacity.

Embodiments according to the present invention thus provide a flexible DD-OFDM optical transmitter architecture that compensates for the effects of chromatic dispersion and can also be used to compensate other effects that might be present on the optical fiber. Simulations demonstrate that fading points are removed even at optical fiber lengths of 80 kilometers. Accordingly, DD-OFDM becomes a practical alternative for optical communication systems. As noted above, DD-OFDM provides a number of advantages over other methods, including lower cost and greater simplicity. Thus, embodiments according to the present invention permit the advantages of DD-OFDM to be brought to optical communication systems.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1A:
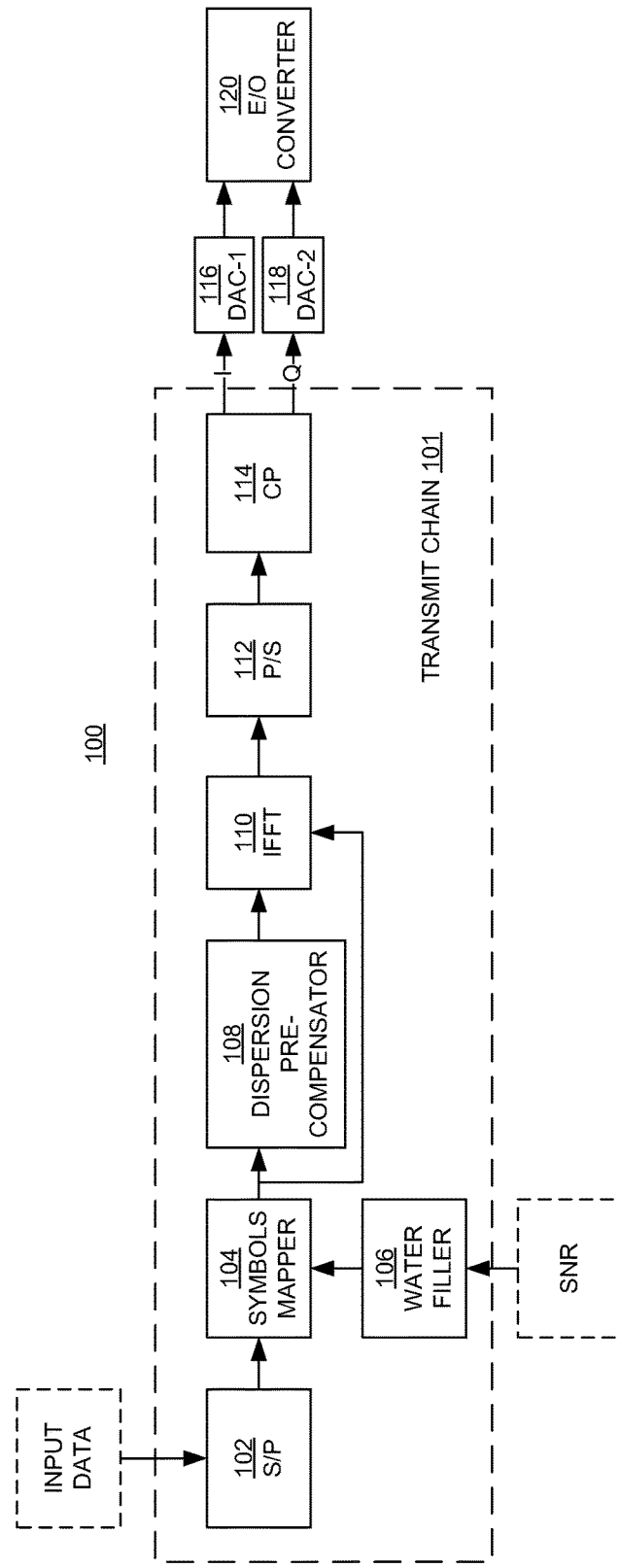
FIG. 1A illustrates elements of a transmit chain in a direct-detected orthogonal frequency-division multiplexing (DD-OFDM) optical signal transmitter in an embodiment according to the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "dividing," "modulating," "transforming," "generating," "adding," "applying", "performing," or the like, refer to actions and processes (e.g., flowchart 400 of FIG. 4) of a computer system or similar electronic computing device or processor (e.g., the controller 510 of FIG. 5). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1A is a block diagram illustrating elements of a transmit chain 101 in a direct-detected orthogonal frequency-division multiplexing (DD-OFDM) optical signal transmitter 100 (hereinafter, the transmitter 100) in an embodiment according to the present invention. The elements may be implemented in hardware, firmware, or software or a combination thereof. Elements other than those shown or described may be included in the transmitter 100 and/or the transmit chain 101. Those elements may include a receiver and a receive chain. That is, the transmitter 100 may be implemented as part of a transceiver.

The transmit chain 101 performs operations to convert an input digital data stream into analog signals that can be transmitted over an optical fiber. The serial-to-parallel converter (S/P) 102 converts serial bit information in the input data to parallel bit information. The symbols mapper 104 divides the bits into data symbols and modulates the symbols onto respective orthogonal subcarriers.

The water-filler 106 amplifies the signal power and/or increases the number of bits for one or more of the subcarriers if necessary based on the observed or predicted optical signal-to-noise ratio (SNR) for each sub-channel.

In the FIG. 1A embodiment, the dispersion pre-compensator 108 is before the inverse fast Fourier transform (IFFT) block 110. The dispersion pre-compensator 108 performs digital signal processing (referred to herein as "dispersion pre-compensation digital signal processing") to compensate for effects such as but not limited to chromatic dispersion.

Figure 1B:
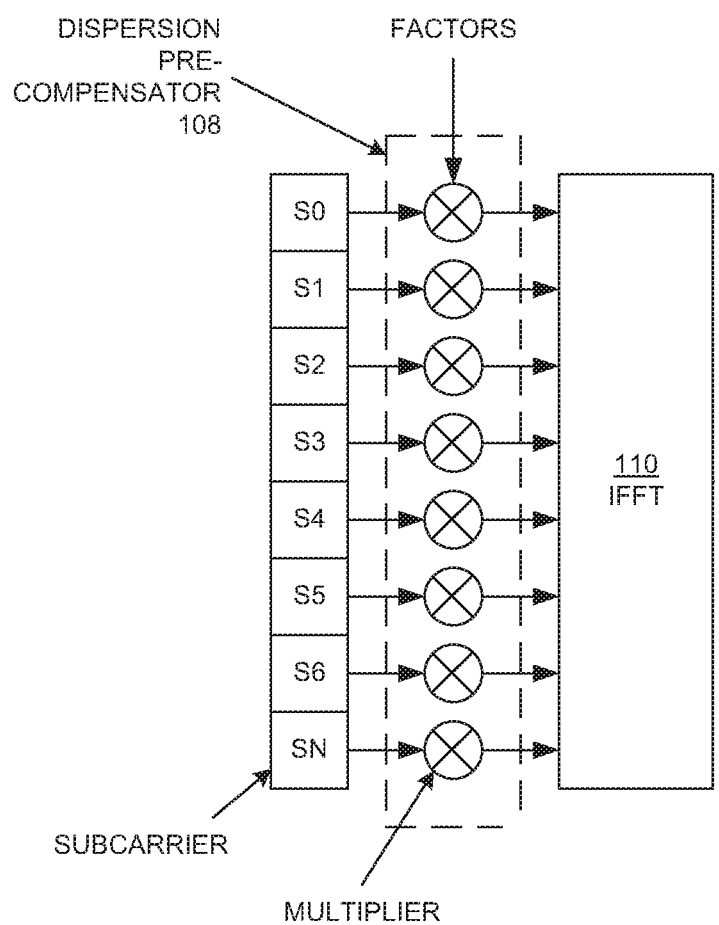
FIG. 1B illustrates a dispersion pre-compensator in an embodiment according to the present invention.

With reference to FIG. 1B, in an embodiment, the dispersion pre-compensator 108 includes a number of parallel multipliers. Each multiplier multiplies a respective subcarrier S0, S1, . . . , SN by a respective dispersion-dependent factor (e.g., phase term). The factors apply a phase rotation to each subcarrier that cancels dispersion in the optical fiber. The factors can be based on observed or predicted frequencies at which power fading may occur. The magnitude of a factor can be based on the degree of power fading observed or predicted for the corresponding frequency. For example, channel conditions can be observed by a receiver and sent to the transmitter 100, which can then determine the factors and/or adjust them.

As noted, the dispersion pre-compensator 108 can be implemented in hardware, firmware, or software. In an embodiment, the dispersion pre-compensator 108 is implemented as an application-specific integrated circuit (ASIC).

With reference back to FIG. 1A, the IFFT block 110 converts the frequency-domain symbols from the dispersion pre-compensator 108 into time-domain symbols. The parallel-to-serial converter (P/S) 112 converts the parallel information back to serial information; the subcarriers are combined into one signal.

A prefix (e.g., a cyclic prefix, a preamble, or guard interval) is added to the symbols in the prefix (CP) block 114.

In embodiments according to the present invention, dispersion pre-compensation digital signal processing is selectively performed. When dispersion pre-compensation digital signal processing is performed, the time-domain symbols are complex values that include an in-phase (or real) component (I) and a quadrature phase (or imaginary) component (Q) representing, respectively, the amplitude and phase of the sinusoid for their respective subcarrier. The I component is sent to the first digital-to-analog converter (DAC) 116 and converted to the analog domain, and the Q component is sent to the second DAC 118 and converted to the analog domain. The electrical-to-optical (E/O) converter 120 then converts the analog signals into optical signals for each of the subcarriers and transmits the optical signals by modulating a laser. In an embodiment, the E/O converter 120 is an I/Q modulator.

There may be times when dispersion pre-compensation digital signal processing is not needed, in which case the dispersion pre-compensator block 108 can be bypassed. When dispersion pre-compensation digital signal processing is not performed by the transmit chain 101, the time-domain symbols include only a real component (I), which can be sent to the first DAC 116 and converted to the analog domain; the analog signals are then sent to the E/O converter 120, then transmitted. When dispersion pre-compensation digital signal processing is not performed in the transmit chain 101, the transmission capacity of the transmitter 100 can be increased using a second transmit chain and a second E/O converter with the second DAC 118. Additional information is provided in conjunction with FIGS. 3A and 3B, discussed further below.

Figure 2A:
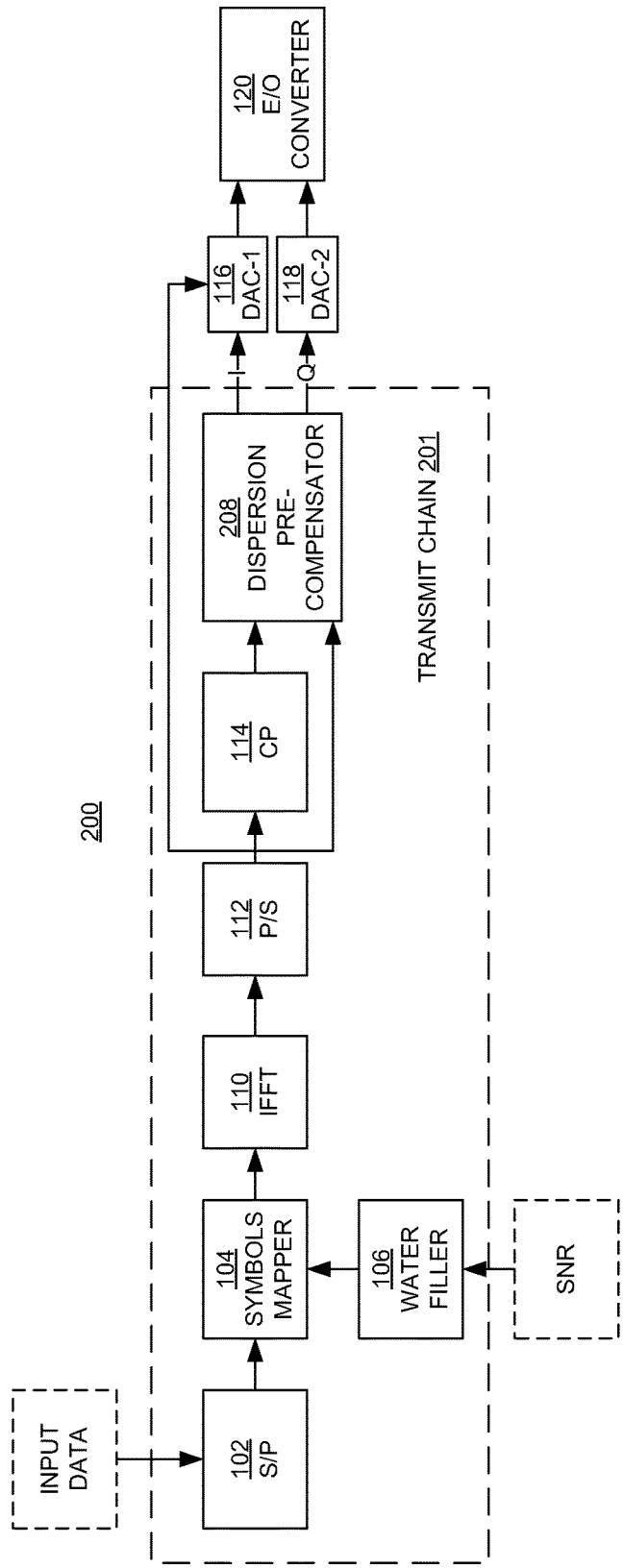
FIG. 2A illustrates elements of a transmit chain in a DD-OFDM optical signal transmitter in embodiments according to the present invention.

FIG. 2A is a block diagram illustrating elements of a transmit chain 201 in a DD-OFDM optical signal transmitter 200 (hereinafter, the transmitter 200) in an embodiment according to the present invention. The elements may be implemented in hardware, firmware, or software or a combination thereof. Elements other than those shown or described may be included in the transmitter 200 and/or the transmit chain 201. Those elements may include a receiver and a receive chain. That is, the transmitter 200 may be implemented as part of a transceiver.

The transmit chain 201 includes elements like those in the transmit chain 101 of FIG. 1A, and those elements are not again described. In the transmit chain 201, in contrast to the transmit chain 101, the dispersion pre-compensator 208 is after the IFFT block 110.

Figure 2B:
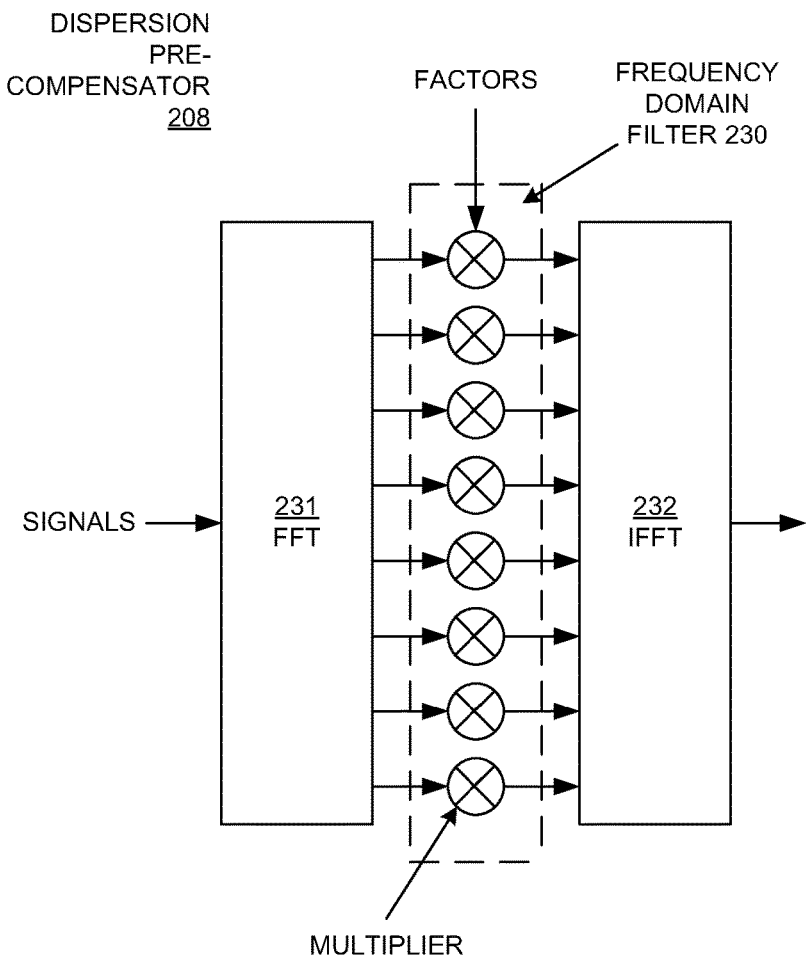
FIG. 2B illustrates a dispersion pre-compensator in an embodiment according to the present invention.

With reference to FIG. 2B, in an embodiment, the dispersion pre-compensator 208 includes a frequency domain filter 230. Because the dispersion pre-compensator 208 is after the IFFT block 110, the incoming signals are in the time domain. The signals are therefore transformed to the frequency domain in the FFT block 231. The filter 230 includes a number of multipliers that apply different frequency terms (factors) to the frequency-domain signals. After the frequency terms are applied by the multipliers, the signals are transformed back to the time domain in the IFFT block 232.

Figure 2C:
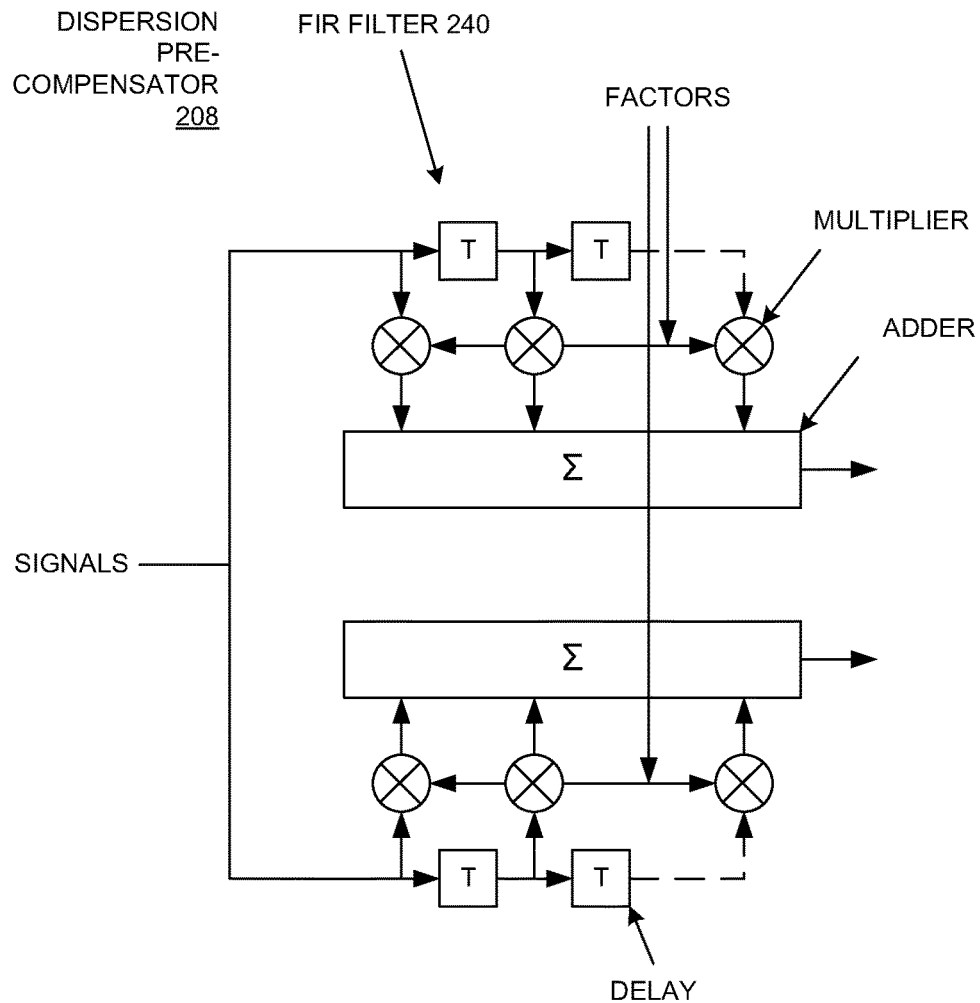
FIG. 2C illustrates a dispersion pre-compensator in an embodiment according to the present invention.

With reference to FIG. 2C, in another embodiment, the dispersion pre-compensator 208 includes a finite impulse response (FIR) filter 240 (e.g., a complex FIR filter). The filter 240 includes a first set of multiplier factors for one branch of the filter and a second set of multiplier factors for the other branch of the filter.

The filter 230 and the filter 240 function in a known manner to adjust the signals in a way that will be cancel inter-symbol interference (ISI) caused by chromatic dispersion and other effects that might be present on the optical fiber. The length of the filter 230 or filter 240 can depend on, for example, considerations such as performance and power consumption.

In the FIG. 2A embodiment, the dispersion pre-compensator 208 operates in a first-in first-out (FIFO) manner and can completely or entirely compensate for ISI. Consequently, the length of the prefix added in the CP block 114 can be reduced, or no prefix may be added, thereby increasing spectrum efficiency. Thus, in the FIG. 2A embodiment, the CP block 114 is optional or can be bypassed. Also, similar to the embodiment of FIG. 1A, there may be times when dispersion pre-compensation digital signal processing is not needed, in which case the dispersion pre-compensator block 208 can be bypassed.

To summarize, embodiments according to the invention pre-distort signals at an DD-OFDM optical signal transmitter to compensate for dispersion in the optical fiber, so that a receiver receives high-quality (dispersion-free) signals. Although described as a solution for dispersion on optical fibers, embodiments according to the invention can be used for other purposes. For example, embodiments according to the invention can be used to generate single-sideband (SSB) OFDM signals without an optical filter, to improve the extinction rate over that achieved by an optical filter.

Figure 3A:
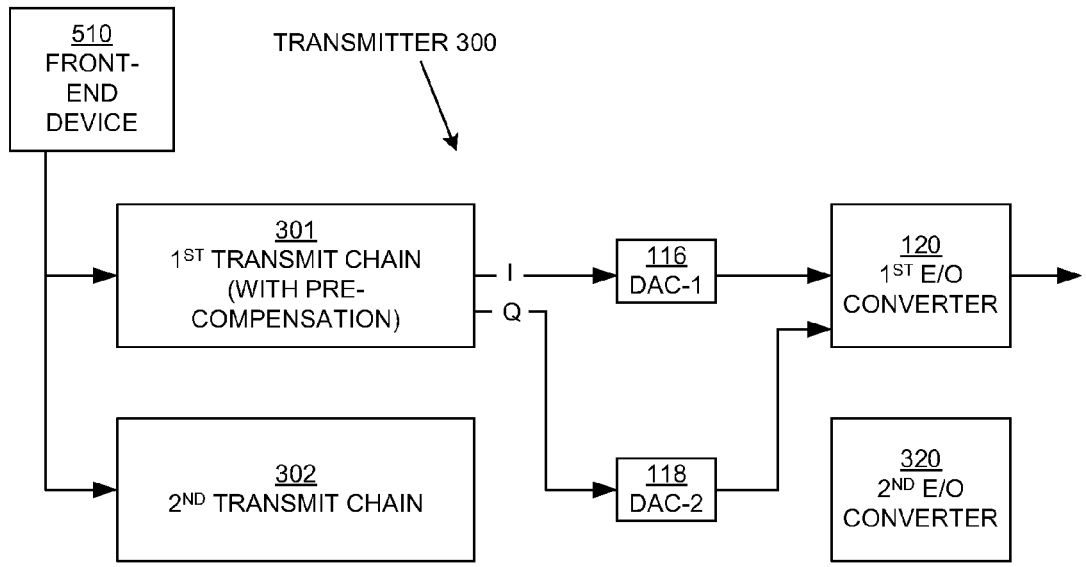
FIGS. 3A and 3B are examples illustrating operation of a DD-OFDM optical signal transmitter in embodiments according to the present invention.
Figure 3B:
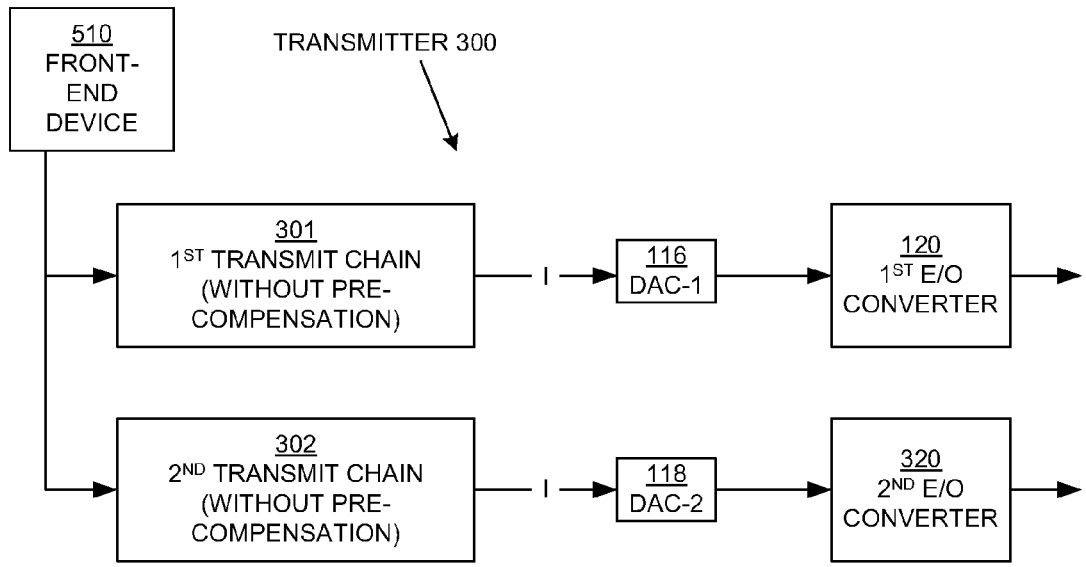

FIGS. 3A and 3B are examples illustrating flexible operation of a DD-OFDM optical signal transmitter 300 (hereinafter, the transmitter 300) in embodiments according to the present invention. The transmitter 100 (FIG. 1A) and the transmitter 200 (FIG. 2A) are examples of the transmitter 300. In the example of FIGS. 3A and 3B, the transmitter includes a first transmit chain 301 and a second transmit chain 302. The transmit chain 101 (FIG. 1A) that includes the dispersion pre-compensator 108 (FIG. 1B), and the transmit chain 201 (FIG. 2A) that includes the dispersion pre-compensator 208 (FIG. 2B or 2C), are examples of the transmit chains 301 and 302. The transmitter 300 also includes the E/O converter 120 and a second E/O converter 320. The transmitter 300 can include more than two transmit chains and more than two E/O converters.

Figure 5:
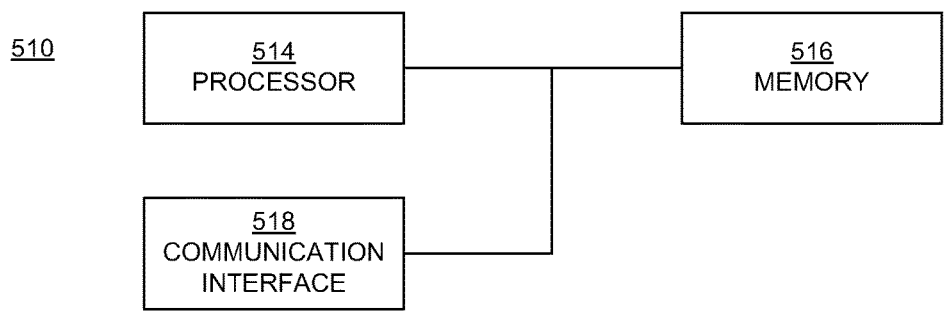
FIG. 5 is a block diagram of an example of a front-end device for a DD-OFDM optical signal transmitter capable of implementing embodiments according to the present invention.

In an embodiment, the transmitter 300 includes a front-end device or module 510 (see FIG. 5). The front-end device 510 can encode the input data stream with convolutional coding and interleaving. The front-end device 510 can be used to determine the factors that are applied by the dispersion pre-compensator 108 (FIG. 1B) and the dispersion pre-compensator 208 (FIGS. 2B and 2C). The front-end device 510 can also determine whether dispersion pre-compensation digital signal processing is to be performed in the transmit chains. As mentioned above, channel conditions can be observed by a receiver and sent to the transmitter 300. The front-end device 510 can use that information, for example, to determine whether or not dispersion pre-compensation digital signal processing is to be performed, then choose whether to bypass the dispersion pre-compensator 108 and the dispersion pre-compensator 208.

FIG. 3A illustrates an example in which dispersion pre-compensation digital signal processing is performed. When dispersion pre-compensation digital signal processing is performed, the I component is sent to the first DAC 116 and converted to the analog domain, and the Q component is sent to the second DAC 118 and converted to the analog domain. The first and second DACs 116 and 118 both send their outputs to the E/O converter 120.

FIG. 3B illustrates an example in which dispersion pre-compensation digital signal processing is not performed by either of the first and second transmit chains 301 and 302 (e.g., the dispersion pre-compensator 108 of FIG. 1B and the dispersion pre-compensator 208 of FIG. 2B or 2C is bypassed). When dispersion pre-compensation digital signal processing is not performed, there is not a Q component. Thus, the I component from the first transmit chain 301 can be sent to the first DAC 116 and converted to the analog domain, and the I component from the second transmit chain 302 can be sent to the second DAC 118 and converted to the analog domain. The first DAC 116 sends its outputs to the E/O converter 120, and the second DAC 118 sends its outputs to the second E/O converter 320. The transmit chains 301 and 302, the DACs 116 and 118, and the E/O converters 120 and 320 can function independently of one another and in parallel.

Thus, as shown by the examples of FIGS. 3A and 3B, when dispersion pre-compensation digital signal processing is not performed, the capacity of the DD-OFDM optical transmitter can be increased (e.g., doubled when there are two transmit chains).

Embodiments according to the present invention thus provide a flexible DD-OFDM optical transmitter architecture that compensates for the effects of chromatic dispersion and can also be used to compensate other effects that might be present on an optical fiber. Simulations demonstrate that fading points are removed even at optical fiber lengths of 80 kilometers; SNR and bit error rates (BER) remain flat across the entire subcarrier spectrum. Subcarriers considered unusable in conventional systems can be used to transmit information using a DD-OFDM optical signal transmitter according to the present disclosure, increasing the capacity of optical communication systems.

Figure 4:
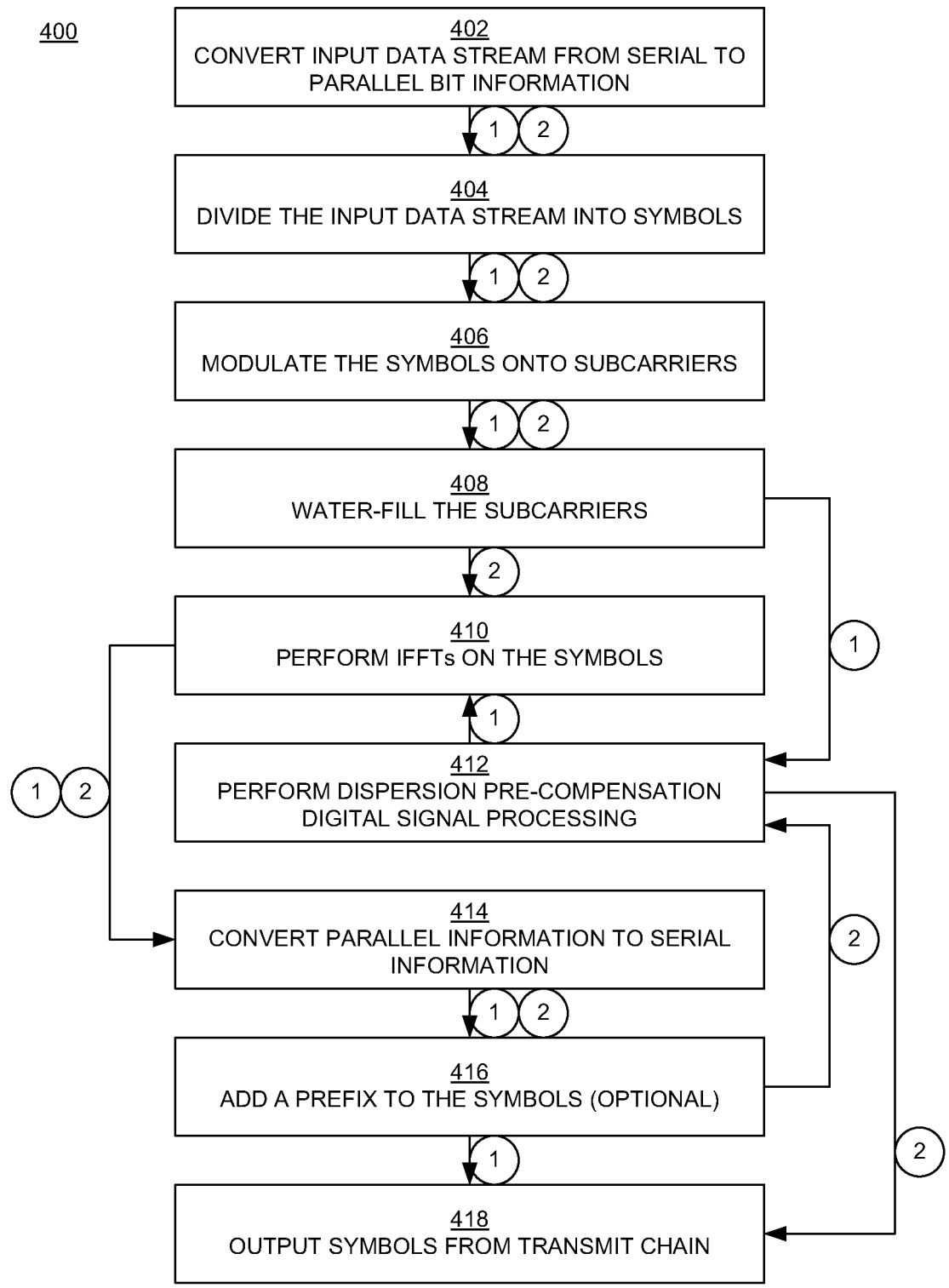
FIG. 4 is a flowchart showing examples of operations included in a method of generating DD-OFDM signals in a DD-OFDM optical signal transmitter in embodiments according to the present invention.

FIG. 4 is a flowchart 400 showing examples of operations that can be performed as part of a method of generating DD-OFDM signals in a DD-OFDM optical signal transmitter in embodiments according to the present invention. Some of the operations included in the flowchart 400 may be performed by the front-end module 510 of FIGS. 3A and 3B, and other operations may be performed by the elements included in the transmit chains 101 and 201 of FIGS. 1A and 2A. The operations in the flowchart 400 may be performed in a different order. As noted above, pre-compensation digital signal processing may be performed before or after the IFFT block 110, depending on the embodiment. In FIG. 4, the path through the flowchart 400 in which pre-compensation digital signal processing is performed before the IFFT block 110 is designated using a circled number 1, and the path through the flowchart in which pre-compensation digital signal processing is performed after the IFFT block 110 is designated using a circled number 2.

In block 402 of FIG. 4, an input data stream is converted from serial bit information to parallel bit information.

In block 404, the input data stream is divided into symbols.

In block 406, the symbols are modulated onto subcarriers.

In block 408, the subcarriers are water-filled.

In block 410, inverse fast Fourier transformations of the symbols are made.

In block 412, dispersion pre-compensation digital signal processing is performed. Dispersion pre-compensation digital signal processing is discussed above. In an embodiment, such processing (e.g., the example of FIG. 1B) is performed before the inverse fast Fourier transformations of block 408 are performed. In another embodiment, such processing (e.g., the examples of FIGS. 2B and 2C) is performed after the inverse fast Fourier transformations of block 408 are performed.

In block 414, parallel information is converted to serial information.

In block 416, in an embodiment, prefixes are added to the symbols. In instances in which the dispersion pre-compensation digital signal processing is performed after the inverse fast Fourier transformations of block 408, prefixes may not be added.

In block 418, the symbols are output from the transmit chain.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

FIG. 5 is a block diagram of an example of a front-end device or module 510 capable of implementing embodiments according to the present invention. In its most basic configuration, the device 510 includes at least one processing circuit (e.g., the processor 514) and at least one non-volatile storage medium (e.g., the memory 516).

The processor 514 generally represents any type or form of processing unit or circuit capable of processing data or interpreting and executing instructions to perform the functions of one or more of the example embodiments described and/or illustrated herein.

The system memory 516 generally represents any type or form of volatile or non-volatile storage device or medium capable of storing data and/or other computer-readable instructions.

The device 510 may include one or more components or elements in addition to the processor 514 and the system memory 516. For example, the device 510 may be implemented by a device that includes a memory controller, an input/output (I/O) controller, and a communication interface 515.

The communication interface broadly represents any type or form of communication device or adapter capable of facilitating communication between the device 510 and one or more other devices or components in, for example, a DD-OFDM optical signal transmitter or transceiver.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to enable others skilled in the art to best utilize the invention and its embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A direct-detected orthogonal frequency-division multiplexing (DD-OFDM) optical signal transmitter, comprising:
    an electrical-to-optical (E/O) converter;
    a first transmit chain operable for:
    performing operations to convert an input data stream into signals to be transmitted, the operations comprising:
        dividing the input data stream into symbols;
        modulating the symbols onto subcarriers;
        adjusting at least one of the subcarriers according to a signal-to-noise ratio of a respective subcarrier by at least one of amplifying a signal power of the respective subcarrier or increasing a number of bits of the respective subcarrier; and
        inverse fast Fourier transformations of the symbols; and
    selectively performing dispersion pre-compensation digital signal processing to generate in-phase and quadrature phase (I/Q) signals that are output to the E/O converter, the I/Q signals including a first I/Q signal generated from the at least one of the subcarriers adjusted according to the signal-to-noise ratio;
    a first digital-to-analog converter (DAC) operable for receiving in-phase components of the I/Q signals and for outputting analog versions of the in-phase components to the E/O converter;
    a second DAC operable for receiving quadrature phase components of the I/Q signals and for outputting analog versions of the quadrature phase components to the E/O converter; and
    a second transmit chain, wherein, if the dispersion pre-compensation is bypassed, the first DAC receives first signals from the first transmit chain and outputs analog versions of the first signals to the E/O converter, and the second DAC receives second signals from the second transmit chain and outputs analog versions of the second signals to a second E/O converter, and wherein the first signals and the second signals have in-phase components but not quadrature phase components.

2. The DD-OFDM optical signal transmitter of claim 1, wherein the dispersion pre-compensation digital signal processing is performed before the inverse fast Fourier transformations and comprises multiplication of the subcarriers by respective factors.

3. The DD-OFDM optical signal transmitter of claim 2, wherein the first transmit chain is further operable for adding prefixes to the symbols.

4. The DD-OFDM optical signal transmitter of claim 1, wherein the dispersion pre-compensation digital signal processing is performed after the inverse fast Fourier transformations and comprises application of a finite impulse response (FIR) filter to signals generated by the inverse fast Fourier transformations.

5. The DD-OFDM optical signal transmitter of claim 1, wherein the dispersion pre-compensation digital signal processing is performed after the inverse fast Fourier transformations and comprises fast Fourier transformations of signals generated by the inverse fast Fourier transformations, application of a frequency domain filter to signals generated by the fast Fourier transformations, and inverse fast Fourier transformations of signals produced by application of the frequency domain filter.

6. The DD-OFDM optical signal transmitter of claim 1, wherein the first transmit chain is further operable for converting the input data stream from serial bit information to parallel bit information.

7. A method of generating direct-detected orthogonal frequency-division multiplexed (DD-OFDM) signals, the method comprising:
    performing, by a first transmit chain:
    dividing an input data stream into symbols;
    modulating the symbols onto subcarriers;
    adjusting at least one of the subcarriers according to a signal-to-noise ratio of a respective subcarrier by at least one of amplifying a signal power of the respective subcarrier or increasing a number of bits of the respective subcarrier;
    performing inverse fast Fourier transformations of the symbols; and
    performing dispersion pre-compensation digital signal processing to generate in-phase and quadrature phase (I/Q) signals that represent the input data stream, the I/Q signals including a first I/Q signal generated from the at least one of the subcarriers adjusted according to the signal-to-noise ratio; and
    a first digital-to-analog converter (DAC) operable for receiving in-phase components of the I/Q signals and for outputting analog versions of the in-phase components to a first electrical-to-optical (E/O) converter;
    a second DAC operable for receiving quadrature phase components of the I/Q signals and for outputting analog versions of the quadrature phase components to a second E/O converter; and
    performing, by a second transmit chain and in response to the dispersion pre-compensation being bypassed:
    receiving, by a first digital-to-analog converter (DAC) operable for receiving in-phase components of the I/Q signals and for outputting analog versions of the in-phase components, first signals from the first transmit chain and outputting analog versions of the first signals to the E/O converter; and receiving, by a second DAC operable for receiving quadrature phase components of the I/Q signals and for outputting analog versions of the quadrature phase components, second signals from the second transmit chain and outputting analog versions of the second signals to a second E/O converter;

wherein the first signals and the second signals have in-phase components but not quadrature phase components.

8. The method of claim 7, wherein said performing dispersion pre-compensation digital signal processing begins before the inverse fast Fourier transformations are performed and comprises multiplying the subcarriers by respective factors.

9. The method of claim 7, wherein said performing dispersion pre-compensation digital signal processing begins after the inverse fast Fourier transformations are performed and comprises applying a finite impulse response (FIR) filter to signals generated by the inverse fast Fourier transformations.

10. The method of claim 7, wherein said performing dispersion pre-compensation digital signal processing begins after the inverse fast Fourier transformations are performed and comprises:
performing fast Fourier transformations of signals generated by the inverse fast Fourier transformations;
applying a frequency domain filter to signals generated by the fast Fourier transformations; and
performing inverse fast Fourier transformations to signals resulting from application of the frequency domain filter.

11. The method of claim 7, further comprising:
converting the input data stream from serial bit information to parallel bit information before dividing the input data stream into the symbols; and
adding prefixes to the symbols after the inverse fast Fourier transformations of the symbols.

12. A direct-detected orthogonal frequency-division multiplexing (DD-OFDM) optical signal transmitter, comprising:
a first transmit chain operable for selectively performing dispersion pre-compensation digital signal processing;
a second transmit chain operable for selectively performing dispersion pre-compensation digital signal processing;
a first digital-to-analog converter (DAC);
a second DAC;
a first electrical-to-optical (E/O) converter; and
a second E/O converter, wherein if the dispersion pre-compensation is not performed in the first transmit chain and in the second transmit chain then the first transmit chain outputs first signals to the first DAC and the second transmit chain outputs second signals to the second DAC, the first signals and the second signals comprising in-phase components but not quadrature phase components, the first DAC sending its outputs to the first E/O converter and the second DAC sending its outputs to the second E/O converter; and wherein if the dispersion pre-compensation is performed in the first transmit chain then the first transmit chain outputs third signals to the first DAC and fourth signals to the second DAC, the third signals comprising in-phase components and the fourth signals comprising quadrature components, the first and second DACs sending their outputs to the first E/O converter.

13. The DD-OFDM optical signal transmitter of claim 12, wherein the first transmit chain is operable for performing operations to convert an input data stream into signals to be transmitted, the operations comprising dividing the input data stream into symbols, modulating the symbols onto subcarriers, and inverse fast Fourier transformations of the symbols.

14. The DD-OFDM optical signal transmitter of claim 13, wherein the dispersion pre-compensation digital signal processing is performed before the inverse fast Fourier transformations are performed and comprises multiplication of the subcarriers by a respective factor.

15. The DD-OFDM optical signal transmitter of claim 14, wherein the first transmit chain is further operable for adding prefixes to the symbols.

16. The DD-OFDM optical signal transmitter of claim 13, wherein the dispersion pre-compensation digital signal processing is performed after the inverse fast Fourier transformations are performed and comprises application of a finite impulse response (FIR) filter to signals generated by the inverse fast Fourier transformations.

17. The DD-OFDM optical signal transmitter of claim 13, wherein the dispersion pre-compensation digital signal processing is performed after the inverse fast Fourier transformations are performed and comprises fast Fourier transformations of signals generated by the inverse fast Fourier transformations, application of a frequency domain filter to signals generated by the fast Fourier transformations, and inverse fast Fourier transformations of signals produced by application of the frequency domain filter.

18. The DD-OFDM optical signal transmitter of claim 13, wherein the first transmit chain is further operable for converting the input data stream from serial bit information to parallel bit information.

* * * * *